(12) United States Patent
Madden

(10) Patent No.: US 6,565,016 B2
(45) Date of Patent: May 20, 2003

(54) FRUIT WAX ATOMIZING

(75) Inventor: Ian Madden, Bacchus Marsh (AU)

(73) Assignee: Colour Vision Systems Pty. Ltd., Bacchus Marsh (AU)

(*) Notice: Subject to any disclaimer, the term of this patent is extended or adjusted under 35 U.S.C. 154(b) by 0 days.

(21) Appl. No.: 09/871,710

(22) Filed: Jun. 4, 2001

(65) Prior Publication Data

US 2002/0007781 A1 Jan. 24, 2002

(30) Foreign Application Priority Data

Jun. 2, 2000 (AU) .............................................. PQ 7933

(51) Int. Cl.$^7$ ................................................. B05B 3/02
(52) U.S. Cl. ............................... 239/222.11; 239/416.4; 239/423
(58) Field of Search ........................... 239/222.11, 223, 239/224, 290, 296, 416.4, 416.5, 418, 423, 432, 433, 498, 523, 524

(56) References Cited

U.S. PATENT DOCUMENTS 3,928,009 A * 12/1975 Perry
4,465,714 A * 8/1984 Petro, IV
5,498,478 A * 3/1996 Hansen et al.

* cited by examiner

Primary Examiner—Lisa A. Douglas
(74) Attorney, Agent, or Firm—Larson & Taylor, PLC

(57) ABSTRACT

A head assembly is provided which is adapted to be connected to the output shaft of a motor. The assembly is used in providing a cloud of liquid wax for coating foodstuffs and includes a collector coaxially attached to the motor output shaft. An internal wall of a dispensing shroud surrounds the collector. A housing is attached to the motor and coupled to a liquid wax source. A delivery tube, which extends from the housing to the collector within the shroud, has an aperture at one end positioned in close proximity to the collector. The liquid wax flows down the tube to form a bead on the collector to be centrifugally dispensed against the internal shroud wall and to run down the shroud to be expelled as a mist.

8 Claims, 2 Drawing Sheets

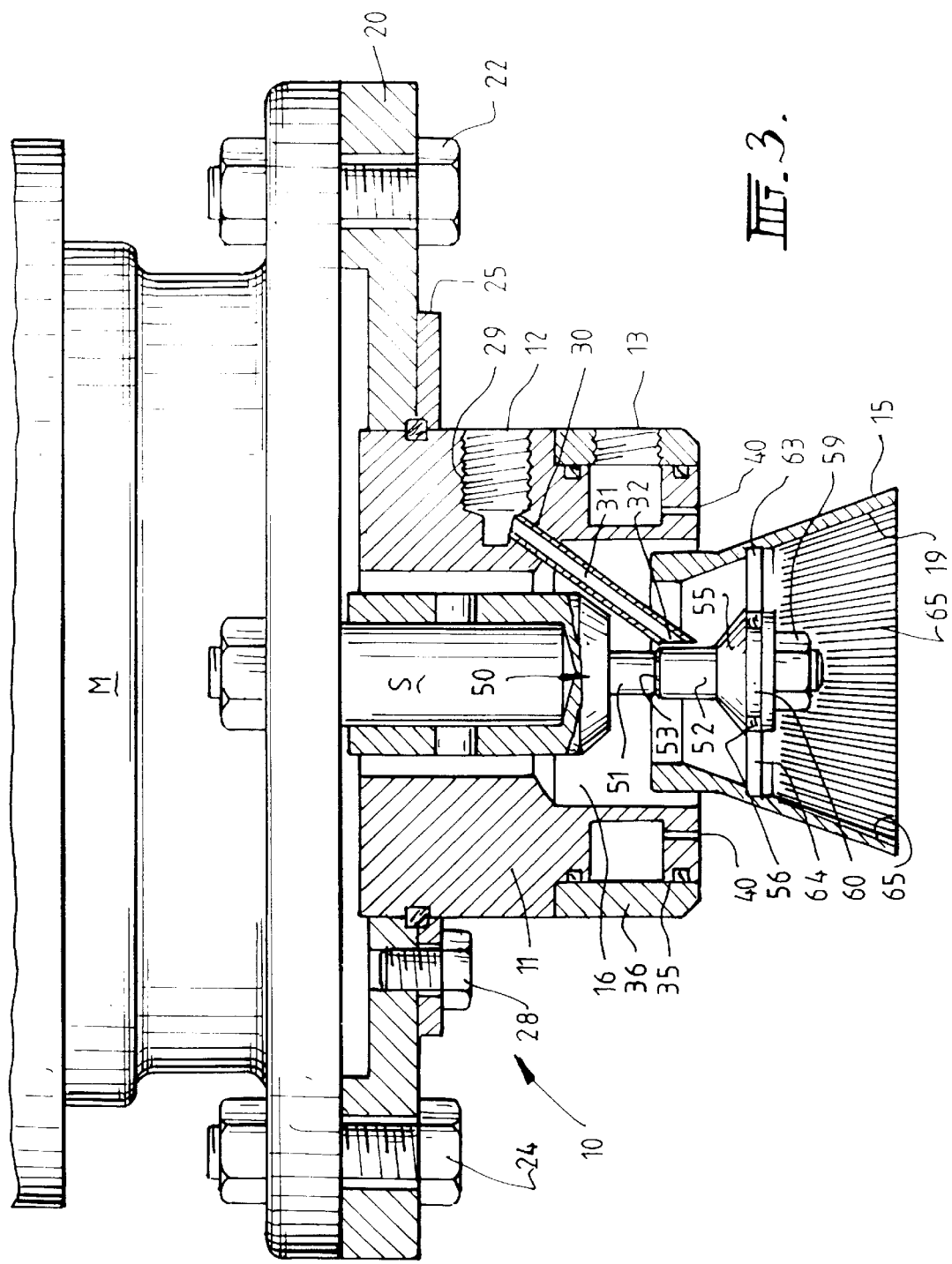

FRUIT WAX ATOMIZING

BACKGROUND OF THE INVENTION

The retail fruit industry has dictated that fruit especially citrus fruit has to be coated in wax prior to sale. Fruit growers have thus inherited the problem to efficiently coat fruit with wax. One way of coating fruit with wax is to provide a cloud of particles of liquid wax and to rotate the fruit past the cloud thereby ensuring that the whole periphery of the fruit is covered with wax. The fruit is often rotated on cylindrical brushes which in turn become coated with wax and serve to further ensure a comprehensive covering of the periphery of the fruit.

The cloud of liquid wax is produced by an applicator head assembly that usually includes a spinning distributor onto which the liquid wax is passed to be centrifugally ejected in a cloud of small particles.

The head assemblies described above have proved inefficient for a number of reasons. In some cases, the wax is distributed in a non-uniform manner meaning that the fruit is unevenly coated. In other situations the applicator clogs with wax when switched off and has to be frequently cleaned. The equipment often has a limited life span with frequent need for maintenance. The final problem with equipment of the kind described above is wastage of comparatively expensive wax.

It is these problems that have brought about the present invention.

SUMMARY OF THE INVENTION

According to one aspect of the present invention there is provided a head assembly adapted to be connected to the output shaft of a motor, the head assembly in use providing a cloud of liquid wax for coating foodstuffs, the head assembly comprising a collector means arranged to be coaxially attached to the output shaft of the motor, a dispensing shroud attached to the collector means to surround the collector means with the internal wall of the shroud spaced radially from the collector means, a housing adapted to be attached to the motor and adapted to be coupled to a source of liquid wax, a delivery tube extending from the housing to the collector means within the shroud, the delivery tube having an aperture at one end being positioned in close proximity to the collector means whereby in use liquid wax flows down the delivery tube to form a bead on the collector means to be centrifugally dispensed against the internal wall of the shroud and to run down the shroud to be expelled as a mist or cloud of wax particles.

Preferably the housing is adapted to be coupled to a source of compressed gas and the underside of the housing is provided with a plurality of equally spaced gas jets so that in use gas under pressure expels from the underside of the housing against the exterior of the shroud to control the shape and configuration of the mist or cloud of wax particles.

In a preferred embodiment, the collector means is a stepped shaft that is coaxially attached to the output shaft of the motor. Preferably, the stepped shaft has a cylindrical portion on which the bead of wax is formed, the cylindrical portion merging into a frusto conical portion that is attached to a disc that extends radially to join the collector means to the interior of the shroud.

The interior of the shroud may be provided with a plurality of longitudinally extending grooves down which the wax flows in use to be centrifugally dispersed from the base of the shroud.

In a preferred embodiment, the exit of the delivery tube is approximately half a millimeter from the collector means. Preferably, the collector means and shroud rotate at speeds of between 2000 and 5000 revolutions per minute.

BRIEF DESCRIPTION OF THE DRAWINGS

An embodiment of the present invention will now be described by way of example only with reference to the accompanying drawings in which:

FIG. 3 is a cross sectional view taken along the lines A—A of FIG. 1.

DETAILED DESCRIPTION OF PREFERRED EMBODIMENT OF INVENTION

Figure 1:
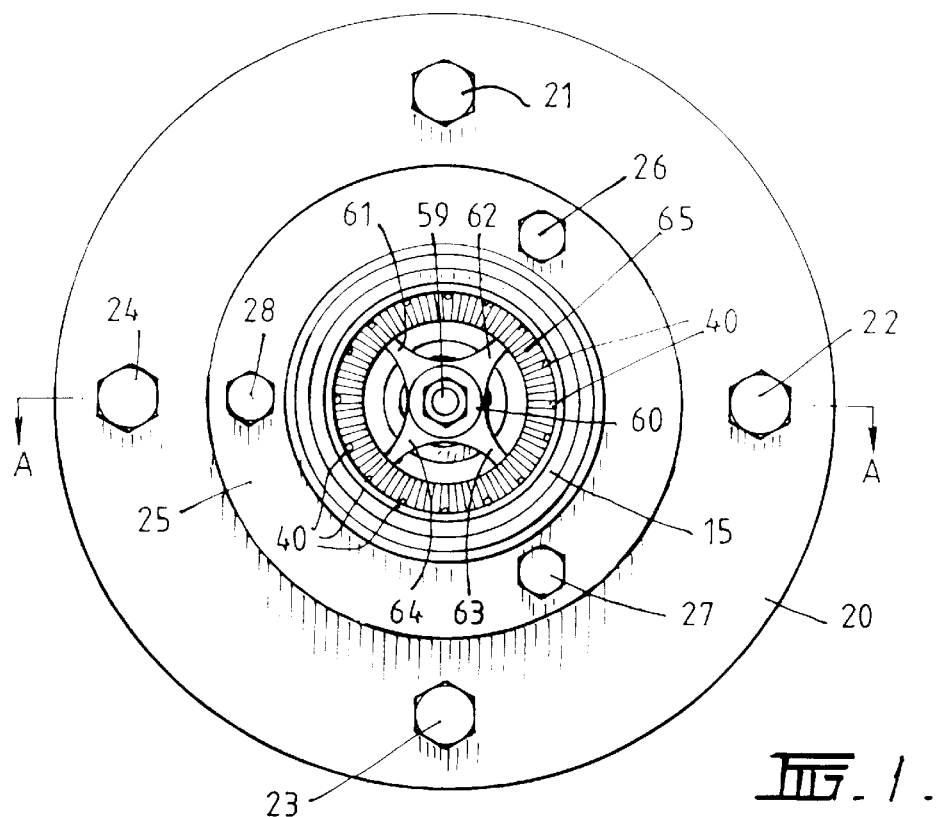
FIG. 1 is a plan view of a wax applicator head viewed from the underside.
Figure 2:
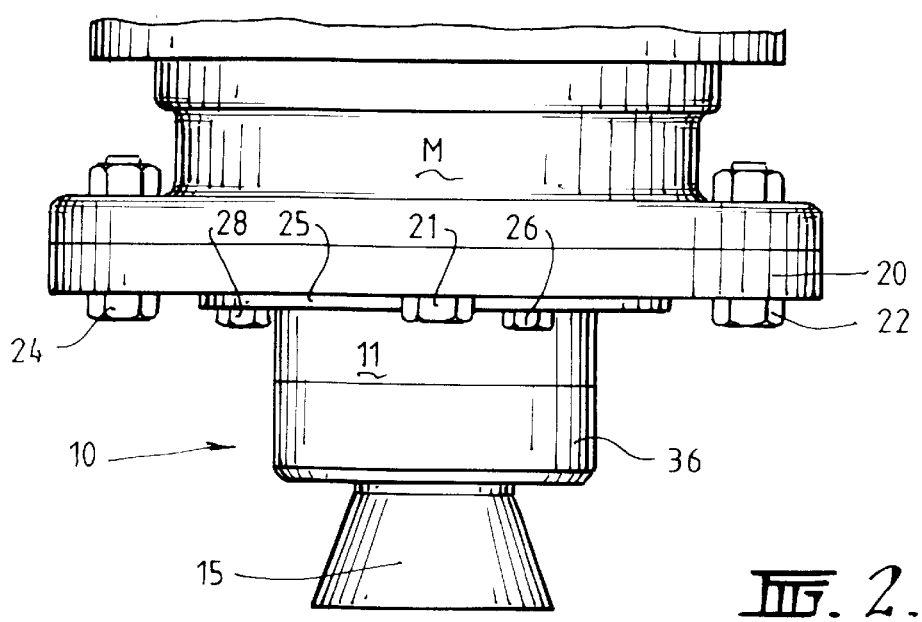
FIG. 2 is a side elevational view of the head.

The head 10 that is illustrated in the accompanying drawings is bolted to the underside of an electric motor M and includes a housing 11 that surrounds the output shaft S of the motor. The housing 11 is adapted to be coupled to sources 12 and 13 of liquid wax and compressed air. The output shaft S of the motor M supports a dispersement shroud 15 which is positioned near a wax feed whereby wax can be fed to the shaft S to be centrifugally dispersed as the shroud 15 rotates with the output shaft S of the electric motor M.

A circular mounting plate 20 is bolted to the base of the electric motor M by four equally spaced nut and bolt assemblies 21, 22, 23, 24. The housing 11 of the head 10 has a central throughway 16 and fits coaxially over the output shaft S of the motor M. The housing 11 is held in position by an annular location flange 25 that is in turn bolted to the mounting plate 20 by three equally spaced bolts 26, 27, 28. The housing 11 has a radial passageway 29 that is coupled to the source 12 of liquid wax. The radial passageway 29 has an inclined bore 30 at approximately 45° to the axis of the passageway and small pipe 31 is located within this bore 30 to extend into the central throughway 16 of the housing 11 at 45° to the vertical.

A lower portion of the housing defines an annular shoulder 35 that is surrounded by a circular flange 36 that is in turn coupled to the source 13 of compressed air. The underside of the housing 11 adjacent the shoulder 35 is provided with twenty four narrow bores 40 that define equally spaced air jets that are directed to the underside of the housing as shown in FIGS. 1 and 3 to cause an annular current of air to pass down against the exterior of the shroud 15.

The output shaft S of the electric motor M terminates in a stepped shank assembly 50 that has a first portion 51 that merges into a slightly enlarged central portion 52 via a step 53 and the enlarged central portion 52 in turn merges into a frusto conical land 55. The frusto conical land 55 has a disc 60 bolted onto its end via a lock nut 59. The disc 60 is held against the lower face of the land 55 via an O-ring seal 56. The disc 60 has four radially extending arms 61, 62, 63, 64 which in turn support the internal wall structure 19 of the shroud 15. The shroud 15 is frusto-conical to taper outwardly towards the base of the assembly as shown in FIG. 3. The disc 60 is fixed to the shroud 15 so that rotation of the disc in turn rotates the shroud. The internal wall 19 of the shroud 15 is provided with a plurality of small depressed channels 65 shown in FIG. 1 that extend from the base of the shroud 15 up to the position where the disc 60 engages the shroud 15. The depressions define a plurality of longitudinally grooves that extend down the wall of the shroud to act as escape channels.

As shown in FIG. 3, the wax delivery pipe 31 has an exit aperture 32 positioned in a vertical plane to be parallel to the axis of the output shaft S. The planar face of the exit aperture 32 is positioned a very short distance, preferably about ½ mm from the periphery of the central portion 52 of the shank 50 of the output shaft S. The output shaft S rotates at a speed of between 2000 and 5000 rpm and, in use, the liquid wax flows down the delivery tube 31 directly against the adjacent central portion 52 of the output shaft S. The wax does not drip down onto the shaft but flows in a uniform continuous manner onto the shaft to thereby collect on the periphery of the shaft S as a bead. The first (upstream) portion 51 of the shank S because it is of a small cross diameter prevents the bead from riding up the shaft S. Effectively, what happens in use is that the bead descends down the shaft S onto the frusto conical land 55 to be then centrifugally projected radially against the internal wall 19 of the shroud 15. As the wax hits the wall 19 it runs down the grooves 65 of the channels to escape at the base of the shroud. The rotational speed at the base of the shroud is such that fine particles of liquid wax project out radially forming a mushroom shaped cloud. Adjustment of the pressure of the air leaving the air jets 40 can vary the shape and configuration of the mushroom shaped cloud to control the size and density of the wax delivery. The internal angle of the shroud and its speed of revolution also affects the particle size and shape and configuration of the mushroom cloud.

The head assembly described above has the advantage that there is a uniform distribution of wax evenly around the shroud so that the resultant cloud of wax contains particles of much the same size. Thus, the fruit becomes evenly coated in wax and there is reduction in wastage of wax. The assembly has the advantage that there are no dynamic seals and no need for bearings and other complicated machinery. The simplicity of the arrangement provides longevity of use and ease of disassembly and assembly for cleaning purposes. The head assembly is also designed to be retro-fitted to existing assemblies.

The claims defining the invention are as follows:

1. A head assembly adapted to be connected to the output shaft of a motor, the head assembly in use providing a cloud of liquid wax for coating foodstuffs, the head assembly comprising a collector means arranged to be coaxially attached to the output shaft of the motor, a dispensing shroud attached to the collector means to surround the collector means, said shroud having an internal wall and the internal wall of the shroud being spaced radially from the collector means, a housing adapted to be attached to the motor and adapted to be coupled to a source of liquid wax, a delivery tube extending from the housing to the collector means within the shroud, the delivery tube having an aperture at one end being positioned in close proximity to the collector means whereby in use liquid wax flows down the delivery tube to form a bead on the collection means to be centrifugally dispensed against the internal wall of the shroud and to run down the shroud to be expelled as a mist or cloud of wax particles.

2. The head assembly according to claim 1 wherein the housing is adapted to be coupled to a source of compressed gas and the underside of the housing is provided with a plurality of equally spaced gas jets so that in use gas under pressure expels from the underside of the housing against the exterior of the shroud to control the shape and configuration of the mist or cloud of wax particles.

3. The head assembly according to claim 1 wherein the collector means is a stepped shaft that is coaxially attached to the output shaft of the motor.

4. The head assembly according to claim 3 wherein the stepped shaft has a cylindrical portion on which the bead of wax is formed.

5. The head assembly according to claim 4 wherein the cylindrical portion merges into a frusto conical portion that is attached to a disc that extends radially to join the collector means to the internal wall of the shroud.

6. The head assembly according to claim 1 wherein the internal wall of the shroud is provided with a plurality of longitudinally extended grooves down which the wax flows in use to be centrifugally dispersed from the base of the shroud.

7. The head assembly according to claim 1 wherein the exit of the delivery tube is approximately half a millimeter from the collector means.

8. The head assembly according to claim 1 wherein the collector means and shroud rotate at speeds of between 2000 and 5000 revolutions per minute.

* * * * *